Sept. 12, 1961  W. M. LAFFERTY  2,999,699
PIPE JOINT
Filed Oct. 6, 1958  2 Sheets-Sheet 1
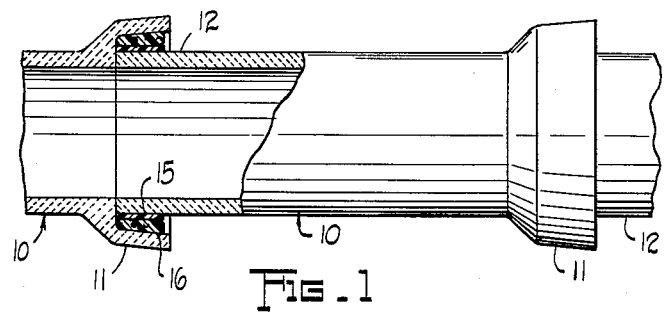
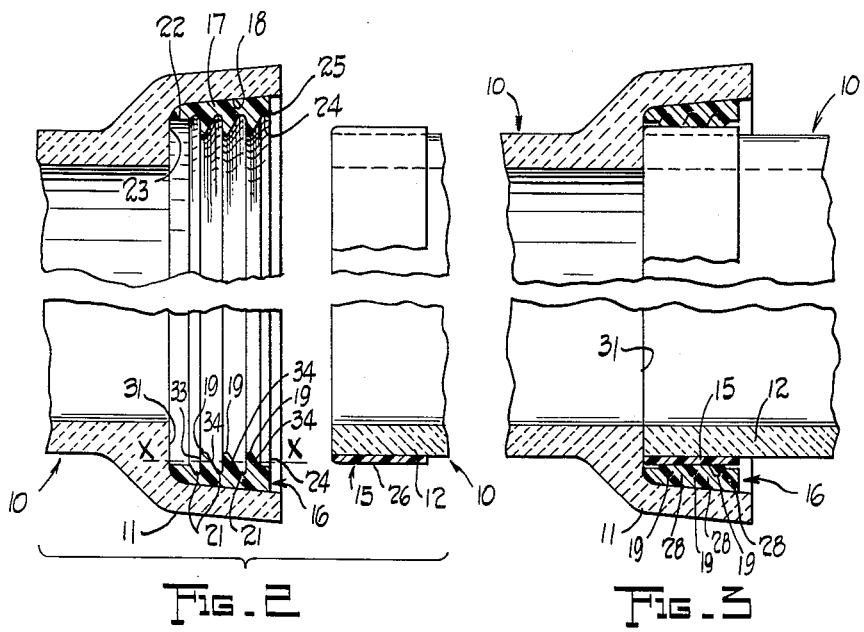
INVENTOR.
WYLIE M. LAFFERTY
BY Bosworth, Sessions,
Herriton & Knowles
ATTORNEYS

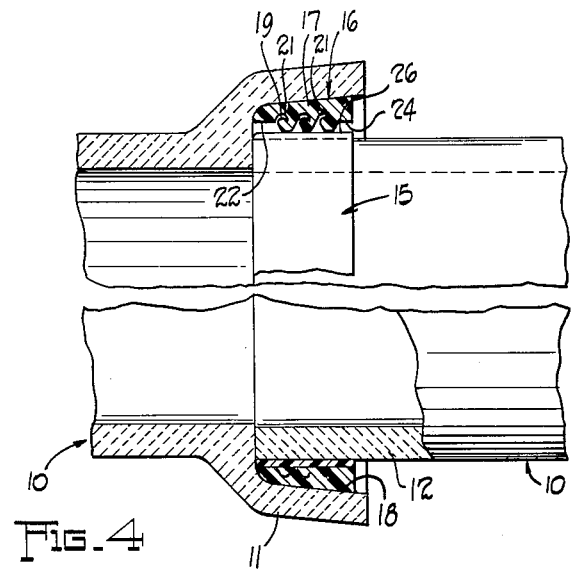

United States Patent Office 2,999,699
Patented Sept. 12, 1961

2,999,699
PIPE JOINT
Wylie M. Lafferty, New Philadelphia, Ohio, assignor to Universal Sewer Pipe Corporation, Cleveland, Ohio, a corporation of Ohio
Filed Oct. 6, 1958, Ser. No. 765,501
1 Claim. (Cl. 285—110)

This invention relates to pipe joints and more particularly to joints for making leakproof, durable connections between vitrified clay pipe sections having bell and spigot ends.

Vitrified clay pipe having bell and spigot ends is widely used in sewer lines and in other services where the requirements are severe. Ordinarily, the pipe sections are not manufactured with any great degree of accuracy. The bells of the sections may be warped or out-of-round, the bodies may be slightly curved and there may be surface defects. Because of these defects, the joints between adjacent bell and spigots ordinarily constitute the weakest links in vitrified clay pipe lines and great difficulty has been experienced in providing joints which make good seals regardless of the presence of ordinary manufacturing defects and adverse conditions of use, such as use under water or in fills where earth movement unevenly loads and stresses the adjacent pipe sections and portions of pipe sections.

Ideal vitrified clay pipe joints should be composed of materials which are not attacked by sewage, ground water or industrial waste and should have the advantage of being manufactured without difficulty at costs which are reasonable and competitive. Such joints, also, should be capable of being assembled in the field, easily and quickly by relatively unskilled labor, without the use of special tools and equipment; and without imposing undue forces on the pipe sections or the joints themselves. Additionally, ideal joints should permit settlement and movement of the pipe lines after the pipes have been laid and back filled and should allow the pipe sections to be displaced angularly with respect to each other to permit adjustment of the pipe lines to grade or curves, both during and after assembly of the joints. Also, such ideal pipe joints should be leakproof against exfiltration against pressures up to the bursting strength of the pipe and against infiltration against external pressures of the order that are likely to be encountered in trenches in which the pipe is to be laid and should remain leakproof under externally applied forces which tend to displace the pipe sections relative to each other and are sufficient to crush the pipe.

The object of the present invention is to provide an improved pipe joint for vitrified clay bell and spigot pipe sections having the above noted advantages and characteristics to a greater extent than any previously known pipe joints. Other objects and advantages of the invention will appear from the following description of a preferred form thereof, reference being made to the accompanying drawings, in which:

FIGURE 1 is a view, partly in section and partly in elevation, of a portion of a pipe line having pipe joints embodying a preferred form of this invention;

FIGURE 2 is a sectional view, on an enlarged scale, showing the adjacent ends of two pipe sections, having a pipe joint embodying this invention, before assembly;

FIGURE 3 is a view similar to FIGURE 2 with the joint assembled;

FIGURE 4 is a view similar to FIGURE 3 showing the joint when adjacent pipe sections are displaced laterally relative to each other;

FIGURE 5 is a somewhat diagrammatic sectional view illustrating the operation of casting the part of the joint that is within the bell end of a pipe section; and, FIGURE 6 is a somewhat diagrammatic sectional view illustrating the operation of casting the part of the joint that is on the spigot end of the pipe section.

As shown in FIGURE 1, a pipe line having joints embodying a preferred form of this invention comprises a series of vitrified clay sewer pipe sections 10 each having a bell end 11 and a spigot end 12. The spigot end 12 is of less external diameter than the interior diameter of the bell end of the adjacent pipe section and is adapted to fit within the adjacent bell end, in the usual manner, with a clearance space therebetween. The joint of my invention is designed to seal this normal clearance space between the exterior of the spigot end of each pipe section and the interior of the bell end of the adjacent pipe section to which the spigot end is joined.

To effect the seal, a collar 15, see FIGURE 2, is cast upon and bonded to the spigot end of each pipe section 10 and a sealing ring 16 is cast within and bonded to the bell end of each pipe section and adapted to function in cooperation with the collar of the adjacent section. Collar 15 has a smooth, round cylindrical exterior surface, is preferably composed of a resilient material such as a vinyl plastisol, and extends throughout the major portion of that length of that part of the spigot end of the pipe section that is inserted within the bell 11 of the adjacent pipe section. Sealing ring 16 is also composed of a resilient sealing material such as a vinyl plastisol and the configuration of the sealing ring, as will appear in detail below, is such as to give, in cooperation with collar 15, the advantages set forth above. More particularly sealing ring 16 is adapted to provide a joint, which is easily assembled without requiring any undue amount of force to slip the spigot end of the pipe section into the bell end of an adjacent section, and which effectively seals the joint and maintains the adjacent pipe sections substantially concentric even under large loads tending to deflect and/or displace the adjacent pipe sections relative to each other.

The configuration of the sealing ring 16 embodying this invention and accomplishing these results is shown particularly on an enlarged scale in FIGURE 2. As shown, sealing ring 16 comprises a body portion 17, which is bonded to the inner surface 18 of the bell of the pipe section and has projecting from it a plurality of radially inwardly extending, flexible annular flanges 19. The flanges 19 extend radially inwardly from the body portion 17 of ring 16 intermediate the ends thereof. I preferably employ three such flanges on pipe sections of intermediate and large sizes, as for example, on pipe sections of 12 inches or greater inside diameter, whereas two flanges are ordinarily sufficient on pipe sections of smaller diameter, and four flanges may be used with pipe sections of very large diameter.

Body portion 17 is also provided with a plurality of annular grooves or channels 21, which are disposed longitudinally inwardly of the respective flanges 19 and constitute annular relief spaces to receive the flanges, as will hereinafter more fully appear, an inner flat cylindrical surface 22, which extends longitudinally inwardly from the inner edge of the inner groove 21 to the inner edge 23 of the body portion 17, and an outer cylindrical surface 24, which extends longitudinally inwardly from the outer edge 25 of body portion 17 to the outer base of the outer flange 19.

The radially inner diameters of the flanges 19 are less than the exterior diameter of the collar 15, so that the flanges make sealing engagement with the sealing surface 26 of the collar 15. The broken line x—x in FIGURE 2 is a projection of the outer diameter of the collar 15, as shown, and illustrates the relationship between the diameters of the flanges 19, the cylindrical surfaces 22 and 24 and the diameter of sealing surface 26 before the parts are assembled. The area of that portion of each flange 19 which projects radially inwardly of the line x—x is substantially equal to the area of the longitudinally inwardly adjacent groove 21 lying radially outwardly of the line x—x. Also there is a clearance space, preferably of about 1/16th of an inch, between the line x—x, the surface 26 and the cylindrical surfaces 23 and 24 of sealing ring 16.

As a result of this construction, when the pipe sections are assembled together, the joint takes the configuration approximately as shown in FIGURE 3 with the inwardly extending portions of flanges 19 folded outwardly into the respective grooves 21 by the sealing surface 26 of collar 15. Since the cross-sectional areas of the portions of the flanges 19 radially within the line x—x are about equal to the cross-sectional areas of the grooves radially without the line x—x, the inwardly folded flanges substantially fill the grooves, as shown. Thus the flanges 19 make firm sealing engagement with the sealing surface 26, the bent over portions of the flanges acting particularly to seal the joint against internal pressures, while the root portions 28 of the flanges furnish strong support to urge the material of the flanges adjacent the root portions into sealing engagement with the surface 26 and thus seal the joint against external pressures, i.e., against infiltration into the line.

With joints embodying this invention, the force required to assemble the spigot within the bell is only that force necessary to bend over the flanges 19 into the position shown in FIGURE 3. There is no need to supply sufficient force to induce severe compressive stresses in the ring, flanges or other materials or to cause the materials of ring, flanges, etc. to flow and the forces are kept within reasonable limits so that the expansive forces exerted on the sealing ring and by the sealing ring on the bell, during assembly of the joint, are well below the forces that might result in bursting or cracking the bell.

After the assembly has been completed, lateral forces applied to the pipe sections tending to deflect one pipe section bodily with respect to the other are initially resisted by the compacted flanges 19; and then if the deflection continues by engagement between the sealing surface 26 and the cylindrical supporting surfaces 22 and 24. After such engagement has taken place, further deflection of the pipe sections with respect to each other can only take place through flow of the material of the collar or the sealing ring inasmuch as the materials themselves are substantially incompressible. The result is that sufficient deflection cannot take place to destroy the seal under loads that the pipe sections are able to withstand. For example, a 15 inch pipe section was subjected to a load, in the center of the section, which was gradually increased to 13,500 pounds while the interior of the pipe was subjected to 15 pounds per square inch of water pressure. The lateral deflection of the spigot end of one pipe with respect to the bell end of the adjacent pipe was only about 80/1000 of an inch, and at 13,500 pounds the bell end of the pipe crushed, still without any previous leakage having taken place at the joint.

Further a joint embodying this invention has relatively great flexibility permitting adjacent pipe sections to displace angularly relative to each other and the joint without causing leakage, breakage or damage at the joint and to the joint and/or pipe sections. Thus, for example, a joint embodying this invention in 15 inch pipe may be displaced at least as much as 3 inches with respect to the remote ends of the joined pipe sections without causing leakage at the joint or damage to the pipe sections. The flexibility of the joint permits pipe lines embodying such joints to be adjusted to grade or laid in curves readily and prevents damage to the pipe joints or the pipe sections themselves due to settling of the pipe line after the trench has been back-filled. Further, the pipe is maintained free from substantial internal obstructions since the joint maintains the adjacent pipe sections substantially concentric relative to each other regardless of angular deflection of the pipe sections with respect to each other or lateral loads imposed upon the pipe sections.

In order to provide sealing rings 16 which have the desired characteristics of resilience and resistance to the chemical action of sewage and industrial wastes and which conform to and are securely bonded to the interior of the bell ends of the pipe sections, the rings are preferably cast from a vinyl plastisol. The casting operation is carried out easily and efficiently by first coating the interior of the bell with a suitable adhesive at room temperature and then disposing a flexible mold 30 within the bell, see FIGURE 5. Mold 30 may be composed, for example, of a silicone rubber material and has a configuration complementary to the configuration of the desired sealing ring. The mold is supported on shoulder 31 of the pipe section and is centered with respect to the bore of the pipe. Centering by visual inspection is ordinarily sufficiently accurate. By carrying out the casting operation in this manner, roundness and substantial concentricity of the flanges 19 with the bore is assured regardless of irregularities in the bell.

After the mold has been positioned within the bell, the pipe section is preheated for a period of time determined by the diameter, size and wall thickness of the pipe, at a temperature of approximately 300° F. Then the plastisol in viscous liquid form is poured into the cavity defined by the inner surface 18 of the bell 11 and the outer surface of the mold 30. The operation is completed by curing the plastisol to polymerize the plastic and convert the plastisol into a flexible resilient solid by heating the assembly at a temperature of from about 150° to 325° F. After cooling, the flexible mold is simply pulled out of the solidified sealing ring. It will be noted that the flanges 19 have longitudinally inner faces 33, see FIGURE 2, that are substantially perpendicular to the axis of the pipe while the conical outer faces 34 of the flanges are parallel to each other with the result that the mold can readily be removed from the solidified ring. The faces 34 preferably extend at an angle to about 37 to 40 degrees to the faces 33.

Various plastisols having the desired characteristics of flexibility and permanence may be employed. I have found that good results can be obtained by using a vinyl plastisol manufactured by the B. F. Goodrich Company and marketed by its under No. 370X2865. A suitable adhesive is A–969–B. With different plastisols, different curing times may be employed in accordance with the recommendations of the manufacturers, it being preferred that the material used have a durometer hardness of about 55.

The collar 15 is cast on the exterior of the spigot end of the pipe sections by means of mold 36, see FIGURE 6, by a method similar to that described for the production of the ring 16. Mold 36 is provided with a cylindrical inner surface 37 of the desired diameter and a shoulder 38 upon which the end of the spigot rests during casting in order to prevent the fluid plastisol from escaping before the curing operation is completed. Mold 36 may be centered with respect to the axis of the pipe section by means of a centering piece 39 disposed within the shoulder 38 and extending upwardly within the spigot end of the pipe section. The collar 15 is also preferably composed of a plastisol, but it is not essential that the collar 15 and ring 16 be composed of the same type of materials. It is important, however, for the collar to provide a round, accurately dimensioned cylindrical surface 26 to cooperate with the sealing flanges of the rings. When the collar is composed of a vinyl plastisol, the heating cycle may be about the same as that described in connection with the production of the ring 16, but the collar preferably is composed of a harder material having a durometer hardness of 79 or more.

The sealing rings 16 and collars 15 are preferably cast at the plant where the pipe sections are manufactured or at a central location rather than on the job and the pipe sections are shipped to the job with the rings already in place. The joints can then be completed by unskilled labor in the field by simply pushing the spigot ends of the respective sections into the bell ends of adjacent sections. The resilient sealing rings 16 center the spigots with respect to the bells and the seal is completed as soon as the spigots are in place. In order to facilitate assembly of the joint and reduce the force necessary to push the spigot ends home, a lubricant, such as any ordinary oil or soap is preferably applied to the respective collars 15 before they are inserted into the sealing rings 16.

From the foregoing description of a preferred form of the invention, it will be seen that pipe sections embodying the joints of the invention can be assembled rapidly in the field by unskilled labor to produce tight joints in which the bores of adjacent pipe sections are automatically substantially aligned with each other and that the joints are sufficiently flexible to permit deflection of the pipe sections in angular directions due to settling to take place without it destroying the leakproof qualities of the joints or damaging the pipe sections themselves. The joint permits only a limited lateral deflection between the adjacent pipe sections coupled thereby even under substantial forces and holds the pipe sections in substantial concentricity at all times.

Those skilled in the art will appreciate that various changes and modifications can be made in the preferred form of the invention described herein without departing from the spirit and scope thereof. The essential characteristics of the invention are defined in the appended claim.

I claim:

A joint for connecting the spigot end of a vitrified clay bell and spigot pipe section to the bell end of another similar pipe sections, said bell end having an internal diameter greater than the external diameter of said spigot end, said joint comprising: a resilient, unitary, substantially incompressible, seamless sealing ring capable of cold flow disposed within said bell end and bonded thereto, and a unitary, substantially incompressible, seamless collar disposed on said spigot end and bonded thereto, said sealing ring comprising a plurality of parallel, resilient, annular sealing flanges each projecting radially inwardly and having an axial outer face sloping at an angle away from the open end of said bell, and having an axial inner face substantially perpendicular to said axis, a plurality of parallel annular grooves equal in number to the number of said flanges and disposed therebetween and of a volume and cross-sectional shape the same as that of said flanges, said collar having a smooth, cylindrical sealing surface engaging said sealing flanges, the external diameter of said sealing surface on said collar being of a size to provide engagement thereof and forming a circumferential line of initial contact with said flanges along the respective sloping outer faces and with further axially inward movement of said seamless collar to bend only the end portions of said flanges extending radially inwardly of said circumferential line of initial contact against said perpendicular inner faces along a circumferential line equal in diameter to said circumferential line of initial contact into the adjacent annular grooves, said flanges and grooves being proportioned with respect to the circumferential line of engagement of the external diameter of said sealing collar therewith so that said adjacent grooves are substantially filled by the bent over end portions of said flanges, and the remaining portions of said flanges adjacent said ring remain substantially unflexed, said sealing ring having inner and outer cylindrical supporting surfaces disposed at its respective ends, said supporting surfaces having an internal diameter no greater than the external diameter of said seamless collar.

References Cited in the file of this patent
UNITED STATES PATENTS

| 1,926,197 | Durr | Sept. 12, 1933 |
| 2,116,099 | Chamberlain | May 3, 1938 |
| 2,294,142 | Turner | Aug. 25, 1942 |
| 2,314,386 | Brend | Mar. 23, 1943 |
| 2,396,491 | Chamberlain | Mar. 12, 1946 |
| 2,451,070 | Chamberlain | Oct. 12, 1948 |
| 2,766,054 | Everhart | Oct. 9, 1956 |
| 2,770,476 | Cleverly | Nov. 13, 1956 |
| 2,896,974 | Bush | July 28, 1959 |